United States Patent

[11] 3,629,820

| [72] | Inventor | Yasuhiko Sakurai<br>Kariya-shi, Japan |
|---|---|---|
| [21] | Appl. No. | 799,633 |
| [22] | Filed | Feb. 17, 1969 |
| [45] | Patented | Dec. 21, 1971 |
| [73] | Assignee | Nippon Denso Company Limited<br>Kariya-shi, Japan |
| [32] | Priority | Feb. 19, 1968 |
| [33] | | Japan |
| [31] | | 43/12157 |

[54] SIGNAL DEVICE FOR PREVENTING REAR END COLLISIONS OF AUTOMOBILES
3 Claims, 2 Drawing Figs.

[52] U.S. Cl. .................................................... 340/72,
317/155.5, 335/182
[51] Int. Cl. ........................................................ B60q 1/44
[50] Field of Search ............................................. 317/155.5;
335/182; 340/72, 81, 331

[56]                    References Cited
UNITED STATES PATENTS

| 1,885,714 | 11/1932 | Hampton..................... | 340/342 X |
| 3,243,773 | 3/1966 | Leichsenring................ | 340/72 |
| 3,487,358 | 12/1969 | Ubukata et al. .............. | 340/81 F |
| 2,887,592 | 5/1959 | Stout et al..................... | 340/81 X |
| 3,247,402 | 4/1966 | Hayden ........................ | 340/331 X |

FOREIGN PATENTS

| 883,164 | 7/1953 | Germany...................... | 340/81 |
| 831,510 | 3/1960 | Great Britain................ | 340/81 |

Primary Examiner—John W. Caldwell, Jr.
Assistant Examiner—Kenneth N. Leimer
Attorney—Cushman, Darby & Cushman ABSTRACT: A signal device for preventing rear end collisions of automobiles including a time limit relay having a normally closed contact therein and a flashing relay having another normally closed contact therein, both of which are connected between brake lamps and a brake switch in an automobile so that the operation of the flashing relay may be stopped by means of the normally closed contact in the time limit relay.

PATENTED DEC 21 1971 3,629,820

INVENTOR
Yasuhiko Sakurai

BY Cushman, Darby & Cushman
ATTORNEYS

SIGNAL DEVICE FOR PREVENTING REAR END COLLISIONS OF AUTOMOBILES

BACKGROUND OF THE INVENTION

1. Field of the Invention

The present invention relates to a signal device for preventing rear end collisions of automobiles.

2. Description of the Prior Art

Although road conditions are being improved in order to keep pace with motorization in recent years, the fact is that the former cannot possibly keep pace with the latter.

The annual increase in traffic accidents due to automobiles is now one of the big social problems. Among traffic accidents due to automobiles, rear end collision accidents tend to increase even more with the improvement of road conditions. There are many cases wherein passengers in an automobile hit from behind in a rear end collision accident suffer from a very serious illness remaining with them for a long time after the accident, which is the cause of serious social loss.

SUMMARY OF THE INVENTION

In view of these circumstances, in order to prevent rear end collisions of automobiles, the present invention proposes a means wherein brake lamps are flashed in the beginning period of their lighting and then switched over to continuous lighting when an automobile is being braked and decelerated so that the effect of warning the succeeding automobile of deceleration by braking in the preceding automobile may be enhanced even more than that by the lighting of conventional brake lamps. At the same time, brake lamps are arranged at both sides of the rear end of an automobile, and besides there are many cases wherein the same lamps serve both as brake lamps and turning indicator lamps. Therefore, in both the case of the separate arrangement of respective sets of brake lamps and turning indicator lamps, the flashing frequency of brake lamps indicating braking operation should be able to be clearly distinguished from that of turning indicator lamps. On the other hand, because in any case there should be no failure of the brake lamps not being lighted, from a safety point of view, the control device for brake lamps has to maintain an extremely high reliability.

In the signal device according to the present invention, a pair of relays each having a normally closed contact therein are employed, one being a time limit relay determining the flashing time of brake lamps and the other being a flashing relay determining the flashing frequency of brake lamps, thus giving a suitable brake signal for preventing rear end collisions of automobiles. Further, the above signal device is characterized in the following points due to normally closed contacts comprised in both relays: in the first place, lighting of brake lamps is not disturbed in case of a failure in the operation of either relay thereby affording high reliability from a safety point of view; in the second place, the structure of the signal device can be made simple by employing relays of the same construction composed of a voltage coil, a normally closed contact and a capacitor; and in the third place, because of the employment of a relay having a normally closed contact therein for determining the flashing time, a magnetomotive force for generating the contact pressure is not required as in the case of a relay having a normally open contact therein, therefore it is possible to determine to that extent a longer time limit and also to reduce the electrostatic capacity of the capacitor when compared with a time limit relay of the same constants having a normally open contact therein.

The signal device according to the present invention has such remarkable effects that a cheap device can be obtained as well as a device having high reliability from a safety point of view.

DESCRIPTION OF THE PREFERRED EMBODIMENTS

Figure 1:
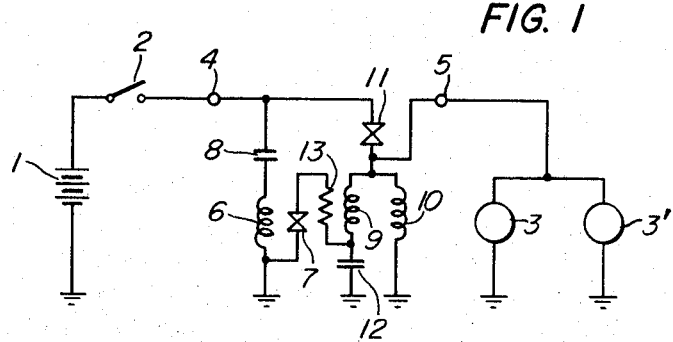
FIG. 1 is a wiring diagram showing a first embodiment according to the present invention.
Figure 2:
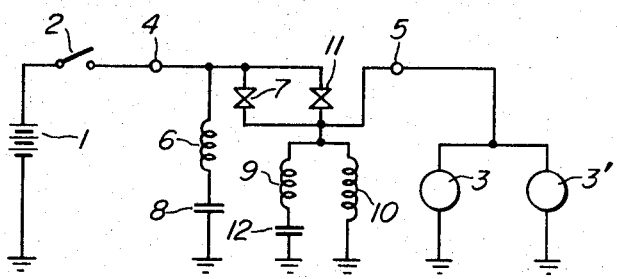
FIG. 2 is a wiring diagram showing a second embodiment according to the present invention.

The embodiments according to the present invention are shown in FIGS. 1 and 2. The same symbols represent the same parts comprised both in FIGS. 1 and 2 therethrough. In FIG. 1, numeral 1 designates a power supply battery, 2 a brake switch interlinked with a brake pedal, 3 and 3' brake lamps, 4 a power supply side terminal and 5 a load side terminal, respectively, of the device according to the present invention. Numeral 6 designates a voltage coil, 7 a normally closed contact driven by the voltage coil 6, 8 an electrolytic capacitor, 9 a voltage coil and 10 a voltage coil wound on the same iron core as and in opposite phase to the voltage coil 9. Numeral 11 designates a normally closed contact, 12 an electrolytic capacitor and 13 a resistor. A relay composed of the voltage coil 6, the normally closed contact 7 and the capacitor 8 serves as a time limit relay for a flashing relay composed of the voltage coils 9 and 10, a normally closed contact 11 and the capacitor 12, and the resistor 13 is connecting both of the relays therebetween.

First, a description will be given with respect to the operation of the device shown in FIG. 1 having such a structure as mentioned above. When the brake switch 2 is closed, a current flows through the terminal 4, the capacitor 8 and the voltage coil 6. Because the terminal voltage of the capacitor 8 is almost zero at the beginning of the voltage impression, a full voltage from the battery 1 is applied to the voltage coil 6, and the normally closed contact 7 is opened by the electromagnetic force of the voltage coil 6 immediately after the brake switch 2 is closed. If the normally closed contact 7 is opened, the flashing relay composed of the voltage coils 9 and 10 wound in opposite phase to each other, the normally closed contact 11 and the capacitor 12 starts its operation interrupting the normally closed contact 11. Accordingly, an intermittent voltage is supplied to the brake lamps 3 and 3', thereby keeping them flashing. On the other hand, the voltage across the voltage coil 6 decreases gradually as charging of the capacitor 8 progresses, and the normally closed contact 7 is restored to its original closed state when a time predetermined by design (0.5 second for example) elapses after the brake switch 2 is closed.

Once the normally closed contact 7 is closed, the capacitor 12 is short-circuited through the resistor 13 and the normally closed contact 7. Thus, there occurs a condition wherein both of the voltage coils 9 and 10 in the flashing relay are directly earthed, and the flashing relay thereupon stops its interrupting operation. In consequence, the normally closed contact 11 is restored to its original closed state. Accordingly, the brake lamps 3 and 3' maintain continuous lighting after the time. Once the brake switch 2 is opened, the capacitor 8 is discharged through the normally closed contact 11, the brake lamps 3 and 3' and the voltage coil 6, thereby restoring all the conditions to their original states. Here, the resistor 13 connected in series with the normally closed contact 7 serves in such a way as stated hereunder. Namely, with respect to the circuit constants in the flashing relay composed of the voltage coils 9 and 10 wound in opposite phase to each other and the capacitor 12, for the purpose of assuring the opened and closed states of the contact 11 in its interrupting operation, the magnetomotive force of the voltage coil 9 connected with the capacitor 12 is predetermined to be larger than that of the other voltage coil 10 by the extent of a reduction in the former magnetomotive force due to a charge remaining in the capacitor 12 not fully discharged, therefore, in case that both magnetomotive forces cancel each other by directly earthing both of the voltage coils 9 and 10, the magnetomotive force of the voltage coil 9 should be reduced by the extent of the above reduction therein by means of inserting the resistor 13 so that a complete cancellation between both of the magnetomotive forces may be achieved. On the other hand, a short circuit current across the capacitor 12 flows through the normally closed contact 7, hence the connection of the resistor 13 in series therewith serves to limit effectively the short circuit current. As stated above, the resistor 13 plays an important role for both of the contacts, namely, in the complete restored closure of the normally closed contact 11 by means of the complete mutual cancellation of the respective effects produced by the voltage coils 9 and 10 and also in the limitation of the short circuit current through the normally closed contact 7.

The next description will be given with respect to the device according to the second embodiment as shown in FIG. 2. In this embodiment two normally closed contacts 7 and 11 are connected in parallel with each other, and their operation will be described hereunder. When the brake switch 2 is closed, a current flows through the terminal 4, the voltage coil 6 and the capacitor 8, thereby opening the normally closed contact 7. If the normally closed contact 7 is opened, as stated already with respect to the first embodiment shown in FIG. 1, the normally closed contact 11 begins its interrupting operation, thereby keeping the brake lamps 3 and 3' flashing.

However, the voltage across the voltage coil 6 decreases gradually as charging of the capacitor 8 progresses, and the normally closed contact 7 is restored to its original closed state when a predetermined time elapses after the brake switch 2 is closed, thereby short-circuiting the interrupting normally closed contact 11 and consequently causing the brake lamps 3 and 3' to maintain continuous lighting. Once the normally closed contact 7 is closed, the capacitor 12 comes to be fully charged, consequently the magnetomotive force of the voltage coil 9 is extinguished, and the magnetomotive force of the voltage coil 10 keeps the normally closed contact 11 opened. When the brake switch 2 is opened, the respective capacitors 8 and 12 are discharged and restored to their original states.

Now, when the make-and-break interval of the brake switch 2 is artificially made shorter than the discharge time of the capacitor 8, the capacitor 8 remains undischarged so that the normally closed contact 7 is not opened and consequently the normally closed contact 11 also does not start interrupting, therefore the brake lamps 3 and 3' are turned on and off responding to the artificial make-and-break of the brake switch 2.

I claim:

1. A signal device for use in an automobile having a power source, said device comprising:
    brake lamps;
    a brake switch for normally energizing said brake lamps from a power source in the automobile whenever the brakes are applied,
    a series-connected capacitor and a first relay coil circuit connected through said brake switch across said power source for energization whenever the automobile brakes are applied,
    a normally closed first set of electrical contacts controlled by said first relay coil to automatically open during an initial time period after brake actuation,
    a flasher circuit comprising two differential parallel-connected relay coils with a capacitor in series with one coil and a normally closed second set of contacts controlled by one of the differentially connected relay coils,
    said second set of normally closed contacts being connected between said brake switch and said parallel-connected relay coils which second set of contacts are also connected to said brake lamps thereby causing a flashing brake lamp operation after energization of the flasher circuit by said power source through said brake switch, and
    said first set of normally closed contacts being connected between said series-connected circuit and said flasher circuit to effectively disable said flasher circuit except during said initial time period after brake actuation when said first set of contacts are opened.

2. A signal device as in claim 1 wherein said first and second sets of contacts are electrically connected in parallel.

3. A signal device in claim 1 wherein said first set of contacts are effectively connected with a resistor across the capacitor of said flasher circuit.

* * * * *